April 24, 1956 R. GROSS 2,742,697
CUTTING IMPLEMENT
Filed Feb. 24, 1955 2 Sheets-Sheet 1

INVENTOR.
REINHOLD GROSS
BY
ATTORNEYS

April 24, 1956     R. GROSS     2,742,697
CUTTING IMPLEMENT
Filed Feb. 24, 1955     2 Sheets-Sheet 2
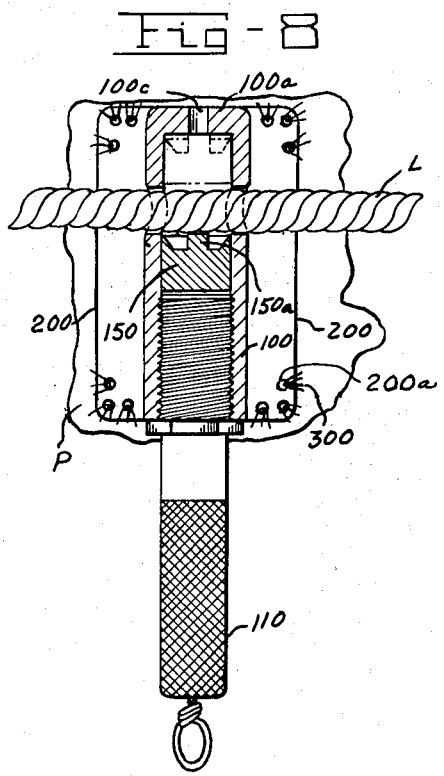
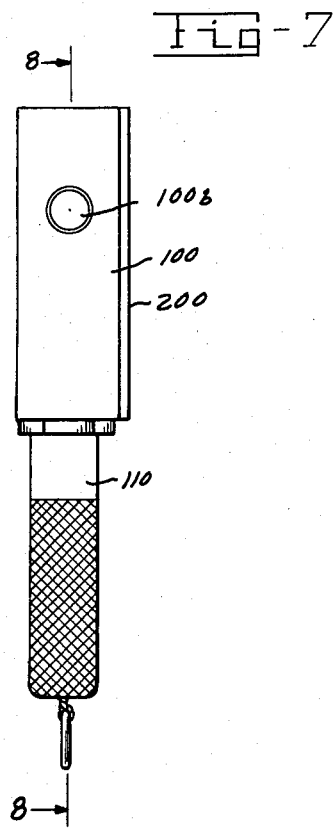
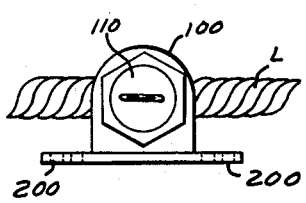
INVENTOR.
REINHOLD GROSS
BY
ATTORNEYS

United States Patent Office 2,742,697
Patented Apr. 24, 1956

2,742,697

CUTTING IMPLEMENT

Reinhold Gross, Dayton, Ohio

Application February 24, 1955, Serial No. 490,437

10 Claims. (Cl. 30—228)

(Granted under Title 35, U. S. Code (1952), sec. 266)

The invention described herein may be manufactured and used by or for the United States Government for governmental purposes without payment to me of any royalty thereon.

This invention relates to cutting implements or portable cutting tools and has as an object the provision of an improved cutting implement with explosively actuated shearing means for parachute reefing lines or the like. It will become clear, however, that the invention is more general and is applicable to the cutting of work material of broad classification including ropes, cables, sheet or web material, rods, and so on.

Parachute reefing lines are used to restrain full inflation of a parachute for a delay period following dropping of the parachute. Parachutes and loads dropped by parachutes are subject to high deceleration during the opening process of the parachutes. If the parachute were allowed to inflate fully at the initial time of its drop, the parachute and/or its load would be subjected to unduly high deceleration and attendant excessive and unsafe gravitational forces. To keep the opening force on the parachute within safe limits, reefing is resorted to. A reefing line usually is looped around the parachute skirt to restrain full inflation of the parachute at the start of its drop. After a time delay insuring a sufficient decrease in the initial drop velocity of the parachute and its load, the reefing line is released to allow full opening of the parachute. Reefing may be used for a main parachute or for one or more stages of a multiple stage parachute apparatus to delay full inflation of the parachute apparatus until the initial velocity of the parachute and attached load have been reduced to a point where excessive opening forces will not prevail.

An object of the invention is to provide a novel cutting implement attachable to a parachute apparatus for parting a parachute reefing line after a delay time insuring reduction of the opening force to a safe value. In accordance with the invention, the cutting implement will include a housing structure containing a free movable cututing or shearing element to be driven into shearing coaction with a companion shearing element for cutting a line positioned by the housing structure between the shearing elements. According to the invention, a time delay explosive actuator will be replaceably carried by the housing structure in a position to apply its explosive force to the rear end of the movable shearing element within the housing structure.

While the invention has particular utility for shearing parachute reefing lines, it is applicable to the shearing of other work material. The general object, therefore, may be stated as residing in a novel cutting implement with a free movable shearing element contained in a casing structure and propelled by an actuator, carried by the casing, into shearing coaction with a companion shearing element in the casing structure, so as to shear work material located by this structure between the coacting shearing elements. More specifically, the actuator is to be of the explosive type with provision for insertably detachably mounting it to the casing structure.

Since the movable shearing element is free within the casing structure, its violent propulsion into coaction with the companion shearing element may result in the striking and blunting of its shearing edge against a fixed part of the casing structure in its path. Further, after shearing the material, the movable shearing element during transport or handling of the implement may move freely back and forth within the casing structure and in so doing may strike and damage its edge against a fixed part of the casing structure. Accordingly, an object of the invention is to provide stop means between the casing structure and the front face of the movable shearing element to arrest this element with its shearing edge short of a confronting fixed part of the casing structure. In one form of the stop means, a projection on the casing structure meets the front face of the movable shearing element to arrest its shearing throw. In an alternative form of the stop means, a projection on the front face of the movable shearing element will meet a fixed part of the casing structure to limit the shearing throw of the movable element.

Another object of the invention, exemplified in its preferred form, is to provide a cutting implement which may be set into operative relation to work material without requiring the material to be inserted or threaded into cutting position between the coacting shearing elements. More specifically, according to the invention, a work piece such as a reefing line or other line may be seized intermediate its ends by the cutting implement to be sheared in an intermediate portion. For example, a reefing line may be in looped position around a parachute skirt and the cutting implement may be applied to the line without opening the loop or threading one end of the line through the cutting implement. In this form of the invention, the casing structure will be composed of separable parts adapted for assembly to one another and to the material to be cut after the material has been attached at opposite ends to some means outside the cutting implement.

Other objects of the invention will become clear from the following parts of the specification, including the claims, and from the drawings, in which:

Figure 1:
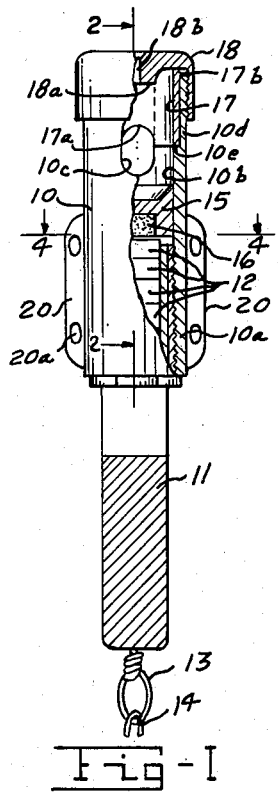
Fig. 1 is an elevation of the preferred form of the novel cutting implement, with parts shown broken away and sectioned for the sake of clarity.
Figure 2:
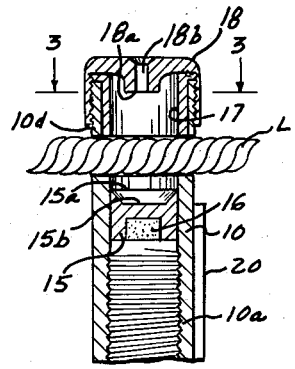
Fig. 2 is a section through the upper portion of the cutting implement and is taken along lines 2—2 of Fig. 1.
Figure 3:
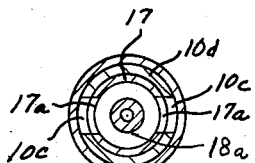
Figure 4:
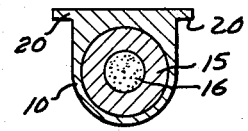

Figs. 3 and 4 are sections, respectively, on lines 3—3 of Fig. 2 and lines 4—4 of Fig. 1.

Figure 5:
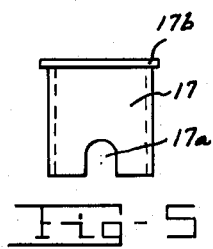

Fig. 5 is a detail showing of the female shearing or cutting die sleeve element of the preferred embodiment of cutting implement.

Figure 6:
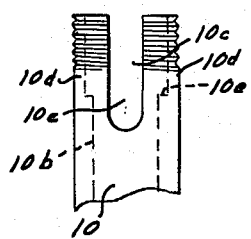

Fig. 6 is a detail view of the upper end portion of the casing in the preferred embodiment.

Fig. 7 is an elevation of an alternative embodiment of the novel cutting implement.

Fig. 8 is a section on line 8—8 of Fig. 7 and shows work material; specifically, a reefing line, in cutting position, and also shows part of a parachute to which the cutting implement may be attached and which is being reefed by the line.

Fig. 9 is a bottom view of the Fig. 7 form of the cutting implement.

Referring now to Figs. 1 to 6, the preferred embodiment includes a composite housing structure the main element of which is a tubular, cylindrical casing 10 open at opposite ends. Casing 10 is internally threaded in its lower portion 10a to receive the threaded end of the shell of an explosive actuator 11. The explosive actuator may be any known type, but the one shown and preferred is a time delay type such as disclosed in Figs. 5 and 6 of Patent No. 2,665,163 and known as the T-2 actuator. This actuator includes a series of delay powder charges 12 adapted for progresive burning from bottom to top when fired. The actuator includes firing means (not shown) and triggering means shown only at its bottom end loop 13. A pull line 14 is passed through loop 13 to pull the triggering means upon dropping of the parachute apparatus. The triggering means will bring about the firing of the powder charges 12 which will burn in delayed fashion for applying explosive propulsion force to the rear end of a movable cutting element 15 contained and guided within the casing 10. The cutting element 15 is formed with a pocket in its rear end which may be packed with a booster powder charge 16 to be set off by explosion of the powder charges 12 for increasing the force of propulsion of the cutting element.

The interior of casing 10 is formed intermediately with a smooth cylindrical section 10b for guiding the cutting element 15. The element 15 is a piston-like male cutting die element with a cylindrical body freely rotatably and slidably fitting within the guiding section 10b of casing 10. The upper, front face of element 15 is formed with a frustro-conical depression bounded at the top by a circular shearing edge 15a and having a flat base 15b.

The upper portion of casing 10 is split lengthwise by diametrically opposite slots 10c open at the top. The solid, arcuate arms 10d, separated by the slots 10c, are externally threaded along their upper portions and are formed with interior shoulders 10e. Freely insertable into position between arms 10d is a cylindrical sleeve 17 the depth of insertion of which is limited by engagement of the bottom edge of the sleeve with shoulders 10e. Sleeve 17 is formed at the bottom with diametrically opposite downwardly facing slots 17a complementary to the upwardly facing slots 10c between arms 10d of casing 10. A reefing line L may be seized and held in cutting position between the respectively oppositely facing slots 10c and 17a. The casing 10 is capped by a crown cap 18 screwed onto the threaded portions of arms 10d. Cap 18 clamps the sleeve 17 tightly down against the shoulders 10e. Note may be taken of the top flange 17b of sleeve 17 providing an extended flat surface for engagement with the underside of the cap 18.

Sleeve 17 serves as a female cutting die element for coaction with the male cutting die element 15. For this purpose, sleeve 17 has the same inside diameter as that of the guiding section 10b of casing 10. Cutting die element 15 has a complementary diameter so that when propelled upwardly it will ride smoothly from guiding section 10b into sleeve element 17, and the shearing edge 15a will coact with the sleeve element to shear the line L confined in cutting position by the slots 10c and 17a.

In order to prevent the shearing edge from striking the cap 18 and being damaged thereby, the upward throw of the cutting element 15 is limited by stop means. In the preferred form of the invention, the stop means includes a central, downward projection 18a which is met by the flat base 15b of cutting element 15 to arrest upward throw of this element with its shearing edge 15a short of the cap 18 in its path. The projection 18 is pierced by a hole 18b through which a pin may be inserted to push the element 15 positively down into the guiding section 10b of the casing 10 and below the cutting position.

The cutting implement described in detail above may be assembled into cutting relation to a line L before or after this line is tied at opposite ends or looped around a parachute skirt. In assembling the implement to the line L, casing 10 is applied to the line by slipping the line into the slots 10c. Sleeve 17 is then inserted between casing arms 10d with slots 17a over the line L. The sleeve is then clamped in position by screwing cap 18 onto the arms 10d. In the clamped-down position of the sleeve 17, the line L is held in cutting position between the oppositely facing closed ends of the slots 10c and 17a. The male cutting element 15 may be inserted into the casing 10 through the top end before this end is closed by the cap 18 or may be inserted through the lower end of the casing before attachment of the cartridge 11. A safe procedure is to pack the cutting element 15 with the booster charge 16 and insert the element into the casing just prior to use of the cutting implement. The powder charges 12 may, for safety, be placed in position also just before use and the cartridge shell with its firing mechanism then secured to the casing 10.

The cutting implement may be attached in any suitable manner to a support, such as the parachute. As shown in Figs. 1 and 4, the casing may be formed with flanges 20 having holes 20a through which securing means may be passed to secure the cutting implement to its support. Such securing means may be bolts, screws, or cords, or the like.

In operation, the pull line 14 will be actuated to pull down the firing pin, the terminal loop 13 of which extends outside the casing 10. The charges 12 will fire and will burn in delay fashion to apply explosive force, boosted by charge 16, to the rear end of cutting element 15. Element 15 will be violently propelled upwardly by the applied force and its shearing edge 15a will coact with the female cutting die sleeve 17 to shear the line L. The upward propulsive throw of element 15 will be arrested by projection 18a with the shearing edge at a clear distance from the cap 18, thereby preventing damage to the shearing edge. The die element 15 thus will remain free for repeated use. The actuator 11 is of the type in which the firing pin is completely pulled out when the pull line 14 is actuated to operate the actuator. Before re-use, new powder charges 12 and a new firing pin will be installed.

Figs. 7, 8, and 9 show an alternative embodiment of the invention. In the alternative embodiment, the cutter 150 is substantially similar to the cutter 15 of the preferred embodiment but is provided on its upper face with an integral stop projection 150a rising above the level of the circular cutting edge. The housing structure in the alternative embodiment is a generally cylindrical single piece 100 with an integral capping end 100a pierced by a central hole 100c having the same function as hole 18b in the main embodiment. The means for positioning the work material in the alternative embodiment comprises diametrically opposite holes 100b in the casing 100 through which the work material such as the reefing line L may be passed. The section of the casing 100 between the capping end 100a and the slots 100b here constitutes the female cutting die sleeve element. A smooth inside portion of the casing 100 below the slots 100b serves as the guiding section for the male cutting die element 150. Below this guiding section, the casing is threaded internally for reception of the actuator 110 which is similar to the actuator 11 of the first embodiment. When the actuator 110 is fired, it explosively drives the cutting element 150 into coaction with the female die element of casing 100 to sever the line L. The upward propulsive throw of the cutting element 150 is arrested by engagement of the projection 150a with the capping end 100a before the cutting edge can strike and be damaged by the capping end.

The cutting implement shown in Figs. 7, 8, and 9 may be suitably attached to a support such a parachute, a portion P of which is shown in Fig. 8. As shown, the casing 100 has integral flanges 200 with a suitable number of holes 200a through which fastening means may be passed to attach the casing to the supporting body such as parachute P. For example, threads may be used to sew the flanges 200 to the parachute, as indicated at 300.

While the invention has been shown and described with reference to the exemplary embodiments, it is to be understood that variations and changes may be made by those skilled in the art without departing from the invention. It is intended therefore to be limited only in accordance with the following claims:

I claim:

1. A cutting implement comprising a housing structure having means to locate work material in a cutting position and provided, above the cutting position, with a female cutting die element and, below the cutting position, with a guide section of the same inside cross-section as the female die element, a piston-like male cutting die element, complementary to the female die element, free within the guide section and provided at the top face with a shearing edge effective upon upward propulsion of the male die element into the female die element to coact with the female die element for shearing the material therebetween, an actuator mounted on the housing device below the male die element and operative to apply upward propulsive force against the bottom of the male element to effect entry of the male die element into the female die element and the shearing coaction between the latter element and said shearing edge, and stop means between the housing structure and the top face of the male die element for arresting upward propulsive throw of the male die element with its shearing edge short of a confronting fixed part of said structure so as to obviate damage to the shearing edge.

2. A cutting implement comprising a generally tubular housing structure provided with means to locate work material in a cutting position and further provided, to one side of the cutting position, with a female cutting die element and a capping element at the end of the female die element remote from the cutting position, said structure having, at the side of the cutting position opposite the female die element, a guide section of the same inside cross-section as the female die element, a piston-like male cutting die complementary to the female die element and free within said guide section and formed at the front face with a shearing edge effective upon propulsion of the male die element toward the female die element, to enter the female die element and coact therewith to shear the material in cutting position, and an explosive actuator detachably carried by the housing structure behind the male die element and operative to apply force against the rear end of the male die element to propel the latter element toward the female die element to effect the shearing coaction between said shearing edge and said female die element.

3. A cutting implement as defined in claim 2, and stop means between said capping element and the front face of the male die element for arresting the propulsive throw of the male die element with the shearing edge short of the capping element, so as to obviate striking of the shearing edge against the capping element and damage to the shearing edge.

4. A cutting implement as defined in claim 2, and stop means between said capping element and the front face of the male die element for arresting the propulsive throw of the male die element with the shearing edge short of the capping element, so as to obviate striking of the shearing edge against the capping element and damage to the shearing edge, said stop means including a projection on the front face of the male die element extending beyond the shearing edge and striking the capping element to limit the propulsive throw of the male die element.

5. A cutting implement as defined in claim 2, and stop means between the capping element and the front face of the male die element for arresting the propulsive throw of the male die element with its shearing edge short of the capping element to obviate striking of the shearing edge against the capping element and damage to the shearing edge, said stop means including a projection on the capping element extending toward the front face of the male die element and engaging a portion of said front face distant from the shearing edge to arrest said propulsive throw before the shearing edge can reach the capping element.

6. A cutting implement as defined in claim 2, said housing structure being generally cylindrical, said female die element, guide section, and male die element being cylindrical elements, the male die element being freely rotatable as well as slidable within the guide section, and the outer circular rim of the front face of the male die element having a shearing edge.

7. A cutting implement as defined in claim 2, said male cutting die element being formed at the rear end with a pocket for containing a booster explosive charge to be set off by said explosive actuator for increasing the force of propulsion of the male die element.

8. A cutting implement as defined in claim 2, for work material such as a reefing line or the like, said tubular housing structure being an assembly of separable parts including a cylindrical casing open at opposite ends, intermediately formed with said guide section, split lengthwise along one end portion to provide a pair of arcuate arms separated by a pair of diametrically opposite slots open at the outer end, said female die element being a cylindrical sleeve insertable between and embraced by said arms, said sleeve having at its inner end a pair of diametrically opposite slots complementary to the slots between said arms, the complementary pairs of slots in the sleeve and between the arms comprising said means to locate the work material in cutting position, said casing being applicable to the work material by reception of the work material in the slots between said arms and the sleeve thereafter being insertable between said arms to position its slots over the work material, whereby the work material is confined in cutting position between the complementary pairs of slots, said capping element being a cylindrical crown cap fastened around said arms for clamping the sleeve in operative position within said casing, and said actuator being attached to the casing to extend into the other open end of the casing.

9. The invention according to claim 8, said casing having a shoulder to serve as an abutment for the inner edge of the sleeve to define its operative position.

10. A cutting implement as defined in claim 2, for work material such as a reefing line or the like, said tubular housing structure comprising a single cylindrical casing open at one end and formed at the opposite end with a closure wall constituting the capping element, said casing being provided intermediately with diametrically opposite slots through which the work material may be passed and which constitute the means for locating the material in cutting position, said casing having a smooth-walled cylindrical chamber below the slots constituting said guide section for the male cutting die element and above the slots a smooth cylindrical inside wall constituting the female cutting die element, said male cutting die element being insertable into the casing through its open end, and said actuator when in place in the casing being in a position for supporting the male cutting die below said slots.

References Cited in the file of this patent

UNITED STATES PATENTS

| 1,010,817 | Strong | Dec. 5, 1911 |
| 2,008,362 | Littlehale | July 16, 1935 |
| 2,017,329 | Temple | Oct. 15, 1935 |
| 2,446,994 | Barker | Aug. 17, 1948 |
| 2,454,528 | Temple | Nov. 23, 1948 |
| 2,687,572 | Matthews | Aug. 31, 1954 |